Sept. 18, 1934.  B. GORDON, JR  1,973,953
METHOD AND APPARATUS FOR MANUFACTURING ARTIFICIAL SILK
Filed July 21, 1931  7 Sheets-Sheet 5

INVENTOR
Beirne Gordon, jr.
BY HIS ATTORNEYS

Sept. 18, 1934.  B. GORDON, JR  1,973,953
METHOD AND APPARATUS FOR MANUFACTURING ARTIFICIAL SILK
Filed July 21, 1931  7 Sheets-Sheet 6

INVENTOR
*Beirne Gordon, jr.*
BY HIS ATTORNEYS
*Cooper, Kerr & Dunham*

Sept. 18, 1934.  B. GORDON, JR  1,973,953
METHOD AND APPARATUS FOR MANUFACTURING ARTIFICIAL SILK
Filed July 21, 1931  7 Sheets-Sheet 7

INVENTOR
Beirne Gordon, Jr.
BY HIS ATTORNEYS
Cooper, Kerr & Dunham

Patented Sept. 18, 1934

1,973,953

UNITED STATES PATENT OFFICE

1,973,953

METHOD AND APPARATUS FOR MANUFACTURING ARTIFICIAL SILK

Beirne Gordon, Jr., Utica, N. Y., assignor to Skenandoa Rayon Corporation, Utica, N. Y., a corporation of Delaware Application July 21, 1931, Serial No. 552,263

24 Claims. (Cl. 18—8)

This application is a continuation in part of my co-pending application Ser. No. 449,133, filed May 2, 1930, for Process of and apparatus for manufacturing artificial silk.

This invention relates to the manufacture of artificial silk, and more particularly to a new and improved method of and apparatus for manufacturing artificial silk yarn from a spun yarn cake into a finished yarn.

An object of the invention is to provide a new and improved process of and apparatus for manufacturing artificial silk. A further object of the invention is to provide a new, advantageous and simplified process of treating artificial silk yarn in cake form. Another object of the invention is to provide such a process, wherein artificial silk yarn cakes, as they come from the spinning pot, are subjected to processing in cake form without rewinding, until all the steps of the treatment of the yarn have been performed, and the yarn is finished and ready for winding into the final package for sale or fabrication. A further object of the invention is to provide a new apparatus for carrying out the foregoing process. Further and other objects of the present invention will be hereinafter set forth in the accompanying specification and claims and shown in the drawings, which, by way of illustration, show one, and what I now consider to be a preferred, embodiment of an apparatus suitable for carrying out the method.

The invention will be hereinafter particularly described as applied to the viscose process of manufacturing artificial silk, it being understood however that the application of the invention is not necessarily limited to that process, but may, under proper conditions, extend to certain other processes for the manufacture of artificial silk.

In the manufacture of artificial silk by the viscose process, according to the pot spinning method, the procedure heretofore generally used has been as follows:

Properly prepared, filtered, deaerated and ripened viscose is ejected under pressure in the form of a plurality of streams from the orifices of a spinnerette into a spinning bath where it is coagulated into a corresponding number of very fine filaments. These filaments, after coagulation by the action of the bath, are led by means of suitable guides from the bath up over a godet wheel and thence down through a reciprocating "traversing funnel" into a rapidly rotating spinning pot. The filaments are spun or twisted into yarn by the rotation of the pot, and the spun yarn is thrown outwardly by the centrifugal force of the rotation, against the interior wall of the spinning pot, where it forms a yarn "cake". This cake is annular in form and consists of a very large number of approximately helically wound layers of yarn. The height of the yarn cake is controlled by the distance of movement of the traversing funnel, which is regulated so as nearly to equal the depth of the spinning pot, and the thickness of the cake depends upon the time of spinning and density or closeness of winding. The cake consists of coagulated and partially regenerated fibrous material derived from the viscose in the proportion of roughly 30% by weight of the cake; and salts, acid and water derived and carried over from the spinning bath and constituting the remaining weight of the cake. The cakes so spun are next doffed from the spinning pot, and may be aged for a suitable time, whereby regeneration of the cellulose from the viscose is completed by the salts and acid remaining in the cake. After any desired aging is completed the yarn from the cakes is reeled into skeins, in which form it is subjected to the numerous subsequent treatments, such as washing, de-sulphuring, bleaching, again washing, soaping, oiling, and so forth, which are necessary or desirable for the production of commercial yarn. For this reason the process is sometimes called the "skeining" process. A common procedure in this process is to first tie a number of lacing strings through the skeins in order to prevent their tangling during subsequent treatment and to assist in backwinding. The skeins are then placed on aluminum rods, usually two rods (one supporting the skein, and the other hanging down inside and supported by the skein and weighing the lower end) for each set of skeins, and are passed through a spray-washing machine in order to remove the acid and salts remaining in the yarn from the spinning bath. After washing, the skeins are placed in so-called "stretcher frames", in which the two rods are held apart, or spaced, in such a way that the skeins cannot shrink to less than a predetermined length during the next step, which is drying. The skeins, supported on the stretcher frames, are then passed through a tunnel drier which removes the moisture and shrinks the yarn so that it is very tightly stretched between the two aluminum rods. After the skeins have thus been dried, they are transferred from the aluminum rods onto rubber or glass rods, on which they are passed through an apparatus in which they are subjected to successive sprays of suitable desulphurizing, washing, bleaching, scouring, washing, soaping, oiling, and other solutions. After this treatment, the skeins are again removed from the rods and wrapped in cloths, in which condition they are placed in hydroextractors and partially dried. After the hydroextraction, the skeins are removed from the cloths and are again placed upon rods for final drying, after which they may be graded or sorted preparatory to final packing and shipment.

The foregoing process has been found to possess many disadvantages and difficulties, among which may be enumerated the "degradation" or deterioration of yarn which occurs in and because of the reeling and skeining operation, involving, as it necessarily does, additional handling of the yarn; the deterioration which occurs during subsequent treatment of the yarn while in skein form; and the degradation of the yarn entailed by backwinding into the final form of package used in fabrication. It will be readily appreciated that the frequent handling of the skeins, their transfer from one apparatus or set of rods to another, and the other items just described, are extremely conducive to injury of the yarn, especially in view of the fact that its weakest condition is while wet. There is also the difficulty introduced by the desirability of matching the schedule of the skeining and subsequent first washing operation to the spinning schedule in order to produce a uniform aging, and hence uniform quality, of the spun yarn. This latter difficulty is accentuated by the fact that in ordinary operation the spinning is continuous, being carried out on a twenty-four hour day schedule, while the reeling and skeining, which must precede the first washing (which washing alone terminates the aging of the spun yarn), is ordinarily carried out in a single shift of, say, eight hours a day.

To avoid or minimize the foregoing and other difficulties it has been proposed under certain conditions to wind the yarn from the cake onto a perforated bobbin, on which all subsequent treatment or "processing" of the yarn may be carried out. Thus washing, desulphuring, bleaching, soaping, and other desired solutions may be successively introduced under pressure into the interior of the perforated bobbin, whence they pass outwardly through the yarn and perform their respective functions thereon.

In the foregoing process of treating the yarn, in which it is wound from the cake onto a perforated bobbin, it has been proposed to wind the yarn directly from the cake onto the bobbin, without any previous treatment of the yarn. In that case the yarn package on the bobbin contains a high percentage of salts and acid from the spinning bath, and relatively tight winding may be necessary if injurious loosening of the package after removal of the salts is to be avoided. It has, however, been found advantageous under certain circumstances, to subject the spun yarn cake to prewashing in cake form, in order to remove the contained salts and acid derived from the spinning bath. This prewashing of the cake affords certain advantages, of which the following are examples: The aging of the spun yarn may be regulated to a predetermined period without any necessity of matching a spinning schedule to a skeining or winding schedule, it being only necessary to wash the cake without any intervening step in order thereby to terminate the aging at a desired and controlled instant; the yarn package, when the yarn has been wound onto the perforated bobbin, is free from salts and acid, and the necessity for a tightly compacted yarn package and the danger of loosening of the package upon removal of the salts, with consequent injury to the yarn, are alike diminished.

While these various heretofore proposed methods of processing yarn when wound on a perforated bobbin may be advantageous under certain circumstances, I have found that each of them is ordinarily accompanied by certain inherent disadvantages. One of the most serious of these is the necessity, which is inseparable from any rewinding process, for initially transferring the yarn from the cake in which it is spun onto a bobbin where it is completed. This additional handling of the yarn, entailing subjecting the yarn to flexure and tension while in a wet condition (in which condition its strength is the least and the likelihood of injury is the greatest) is a frequent source of injury to, and degradation of, the yarn. Another disadvantage of the perforated bobbin processing methods, is, if prewashing is not employed, that the yarn package, when wound on the bobbin, necessarily contains salts and acids from the setting bath which continue to age it until a washing operation can be performed, thus tending to produce non-uniform aging of the yarn product from one part of the factory production week to another and consequent non-uniformity of the yarn. If, on the other hand, it is desired to employ the prewashing step, none of the heretofore proposed methods, so far as I am aware, have proven commercially satisfactory; and all of the bobbin processes necessarily include, whether prewashing is employed or not, the injurious and degrading step of winding the yarn from the cake onto a bobbin.

Since washing the yarn after rewinding on a bobbin entails the removal of a considerable volume of salts and acids which have theretofore been retained in the yarn, it may be necessary to wind the yarn tightly on the bobbin in the first instance, so that it will not become unusably loose after it has been washed. This tight winding of the yarn onto the bobbin is at once injurious in itself, due to the tension and flexure while the yarn is permeated with salts and acid, and also nevertheless insufficient to prevent the yarn from becoming loose on the bobbin after it has been washed. This looseness of the yarn on the bobbin affords opportunity for injury to the yarn during the subsequent processing, and may also lead to injury and degradation of the yarn when it is finally wound off the bobbin to form a cone, skein or other package in which it is finally to be sold, or from which it is to be fabricated.

To avoid these and other difficulties of both the skeining and the bobbin-processing methods of artificial silk yarn manufacture, and to provide a process in which the yarn is not injured or degraded by handling, rewinding, skeining or in any of the other ways that I have mentioned; in which variation in the grade of the yarn by reason of different aging times, whether from day to day or from one part of the manufacturing week to another, is avoided; in which the advantages of the heretofore known methods of processing yarn, either by skeining or by winding it on perforated bobbins, are secured without the attendant disadvantages of those methods; and in which washing of the yarn may be successfully performed in order to terminate the aging process at a desired time to give a uniform product, without the necessity for first rewinding the yarn onto a perforated bobbin with consequent injury to the yarn, I have devised the process which, together with the most suitable form of apparatus which I now know, constitutes the subject-matter of this application.

This process consists, broadly, in first spinning an artificial yarn cake from viscose, in a spinning pot, by the usual pot-spinning method, and then subjecting the spun yarn, in cake form, and without any rewinding or disturbance thereof, to the action of a desired liquid or liquids by placing the yarn cake in a perforated processing holder adapted to support the yarn cake exteriorly and prevent stretching, distortion or injury of the yarn; and while the cake is so supported and retained, forcing the desired liquid or liquids therethrough from the interior of the cake outwardly, under a pressure difference or gradient between the inside and outside of the cake, by introducing the liquid inside the perforated holder and interiorly of the yarn cake. The desired treatment may be, in accord with the present method, a treatment with a single liquid only, as for example water, to accomplish a washing of the yarn to remove the salts and acid therefrom; but according to a preferred manner of carrying out my process, the yarn cake, while arranged and supported in the processing holder as described, is successively subjected to the action of the several desired processing liquids in their proper sequence, so that all of the steps of the treatment of the yarn, including the initial washing if employed, are performed upon the undisturbed yarn cake as it originally comes from the spinning pot, without any rewinding or handling of the yarn until it is finished and ready to be wound onto the cone or bobbin, or into the skein, to be sold or fabricated.

Figure 5:
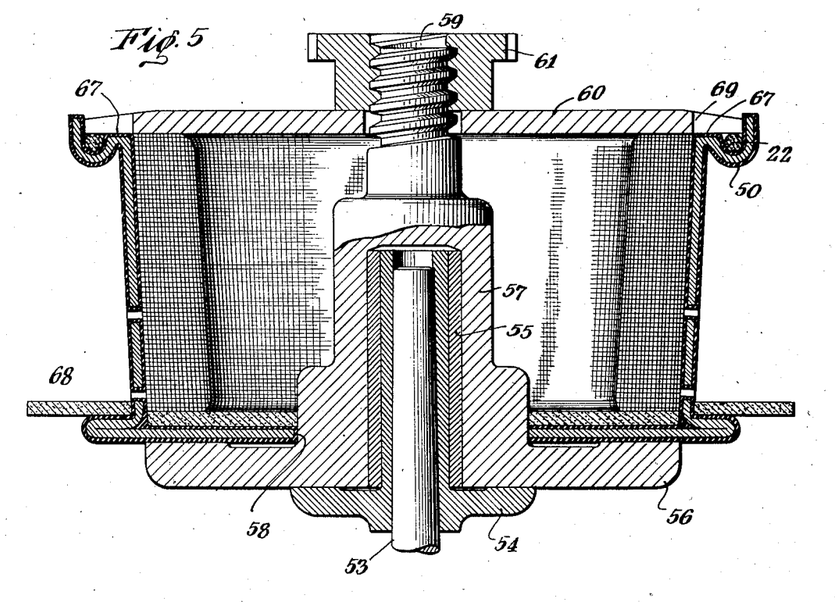
Fig. 5 shows a detail of the pot assembly for the hydroextractor.
Figure 6:
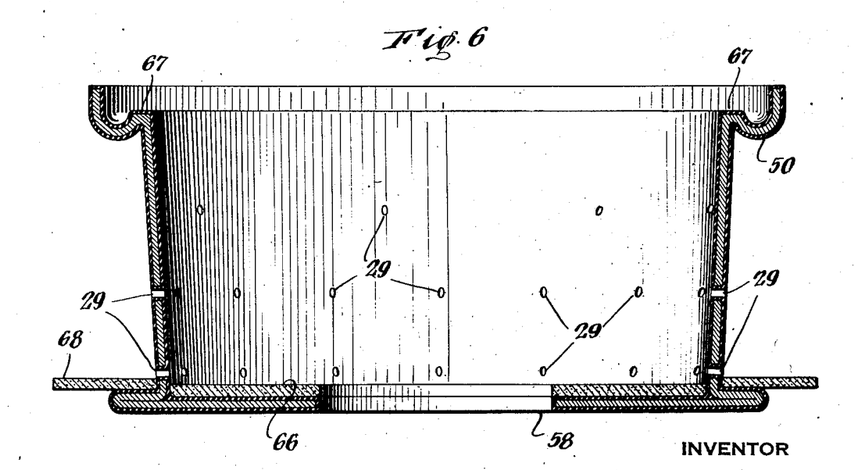
Fig. 6 shows a detail of a processing container or pot—sometimes herein also referred to as a cake holder—for use in the apparatus.

In carrying out this process the yarn cake may, if desired, be wrapped or partially enclosed in a suitable fabric or textile material, for example cheesecloth, in order to reduce unwinding or snarling, to protect it from possible injury, and to prevent channeling of the yarn at or near the liquid-discharge perforations. A suitable arrangement is to place over the processing holder, before the yarn cake is inserted therein, a piece of cheesecloth of sufficient size to cover the bottom and outside of the cake, and have its edges fold over the top of the cake and drop down inside. The yarn cake is then put in place in the holder, and the fabric folded over it, and its edges dropped down inside. When the liquid inlet to the cake holder is in the bottom thereof, incoming liquids are then filtered by the textile material before reaching the yarn. As a further insurance against unwinding of the yarn cake, it may suitably be tied around with thread or string at spaced intervals, for example in three places. The use of an enclosing fabric material, or of other means specifically adapted for the purpose, may also be so conducted as to afford a slight spacing, or layer of permeable material, between the outer surface of the yarn cake and the inner wall of the supporting perforated cake holder, so that liquid passing through the yarn cake is enabled to find its way, by seepage or similar means, to a discharge perforation, and thus escape. A suitable upper closure or cover may also be applied to the cake holder, and also a rubber gasket, or a seal, the latter being provided, for example, by a flat annulus at the top of the holder, upon which the cover is seated, so that the desired liquid or liquids may be introduced interiorly of the annular yarn cake under suitable pressure to cause them to pass outwardly therethrough in spite of the compactness of the cake and substantially without leakage, so that all of the liquid is forced through the yarn. In some cases I have found it desirable either to insert inside the cake holder, below the yarn cake, a flat rubber or other suitable ring or washer 66 (Fig. 6), or to proportion the depth of the cake holder, so that the yarn cakes, when placed in the holder, project a small amount above its periphery. When the cover or upper closure (which may be the bottom of the perforated container next above in the stack, as described below) is then seated, the contained cake is slightly compressed, thus reducing any tendency toward leakage above or below the cake. In one suitable arrangement, as will be hereafter more fully described, a plurality of cake holders may be stacked one above the other, so that the bottom of each cake holder forms the upper closure for the one below. The bottom of the cake holder (or pot) above may seat on the flat annulus or seat 67, (Figs. 5 and 6) in order to reduce leakage. If desired, an annular washer or flap 68, (Figs. 5 and 6), suitably of rubber, may also be provided exteriorly of the cake holder, so as to prevent processing liquid from collecting in the groove 50 (Figs. 5 and 6). This washer 68 serves to divert the processing liquid which flows down the sides of the pot, and carry it away from the groove in the pot below when the cake holders or pots are stacked one above the other. A suitable liquid inlet is also provided for introducing the liquid into each perforated cake holder, and is preferably centrally located in the bottom thereof. A perforated collar, or annular perforated wall, may also under certain circumstances, be provided and arranged to be placed within the annular yarn cake, or be constructed integrally with the container, where it performs a protective function, and may also serve to prevent an injurious first rush of liquid, and to promote a uniform application thereof. By suitable design of the apparatus it may be possible to make the cake processing containers or pots the same as, or interchangeable with, the spinning pots, and in that case the spun cake need not be removed from the pot in which it is spun, the processing being carried out in the spinning pot itself.

The present invention and application relates both to the novel process of yarn treatment heretofore referred to, and to what is at present a preferred form of apparatus for performing the same, both of which I shall now describe in greater detail in connection with the accompanying drawings. It is to be distinctly understood, however, that my process may be carried out, although, so far as I now know, to less advantage, in various forms of apparatus other than the particular one herein described.

Figure 1:
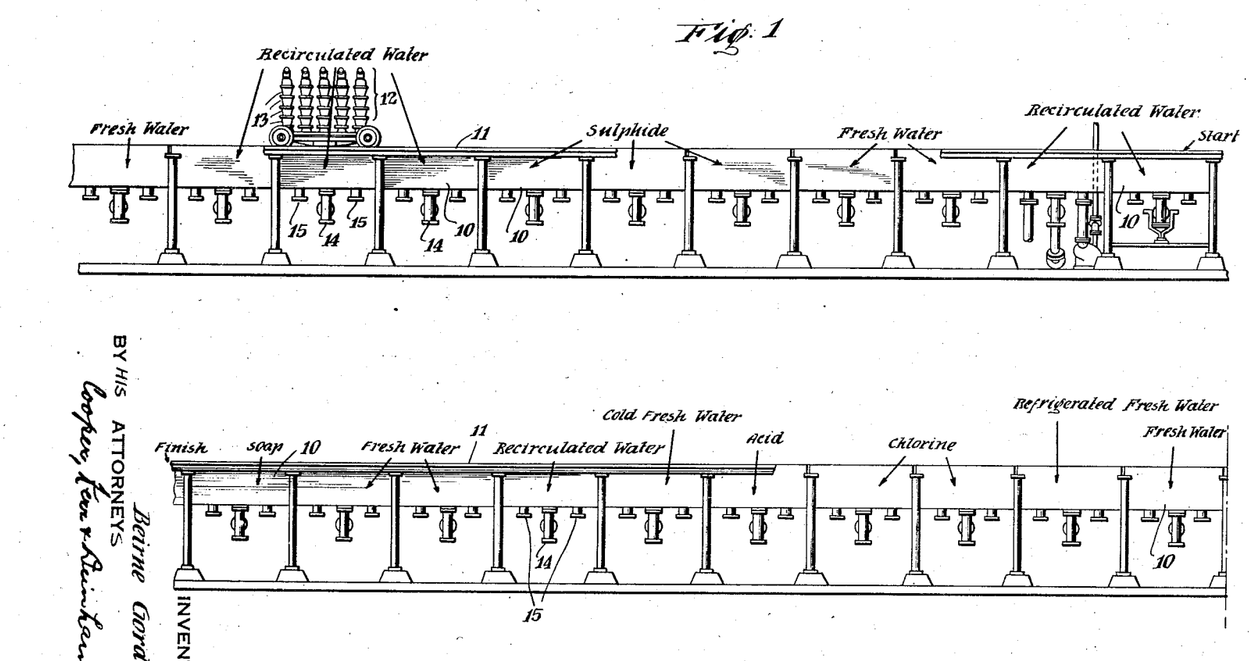
Fig. 1 is a side elevation of the general assembly of the apparatus.

Referring now more particularly to Fig. 1 the apparatus there shown comprises a succession of adjoining tanks or vats 10. A set of rails, 11, is located above them. A carriage 12 is arranged to run on these rails, and is so constructed, as will later be more particularly described, that a number of cake processing containers, or pots 13 in which are placed the cakes to be treated, may be mounted thereon for processing. Each vat is provided with an inlet pipe 14 and one or more outlet pipes 15. The inlet pipe 14 is arranged and disposed so that the inlet 16 to the distributing manifold chamber 18, (Fig. 2) on the movable carriage 12 can be connected thereto in the manner that will presently be described.

By way of example, I have indicated in Fig. 1 one suitable succession and arrangement of processing liquids which may be employed in the various vats 10. According to this example, the first two vats are devoted (starting from the upper right) to processing with recirculated water; the next two are for fresh water; the next three are for sodium sulphide solution for desulphuring the yarn; the next three are for recirculated water; the next two are for fresh water; the next is for refrigerated fresh water; the next two are for chlorine solution for bleaching the yarn; the next is for weak hydrochloric acid used as an antichlor; the next is for cold fresh water; the next, for recirculated water; the next two for fresh water; and the last one for soap solution. In addition to, or in place of, the use of a soaping solution, the yarn may be oiled with an emulsion. It may also be sized for weaving or dyeing. Dyeing, if desired, may also be performed in the same or similar apparatus, and suitable additional vats or stations may be provided for that purpose.

Of course, the number of vats employed, and the solutions used in each, may be varied as desired, or as is found suitable, and in accord with the desired product. The foregoing is given only as one practical example.

Figure 2:
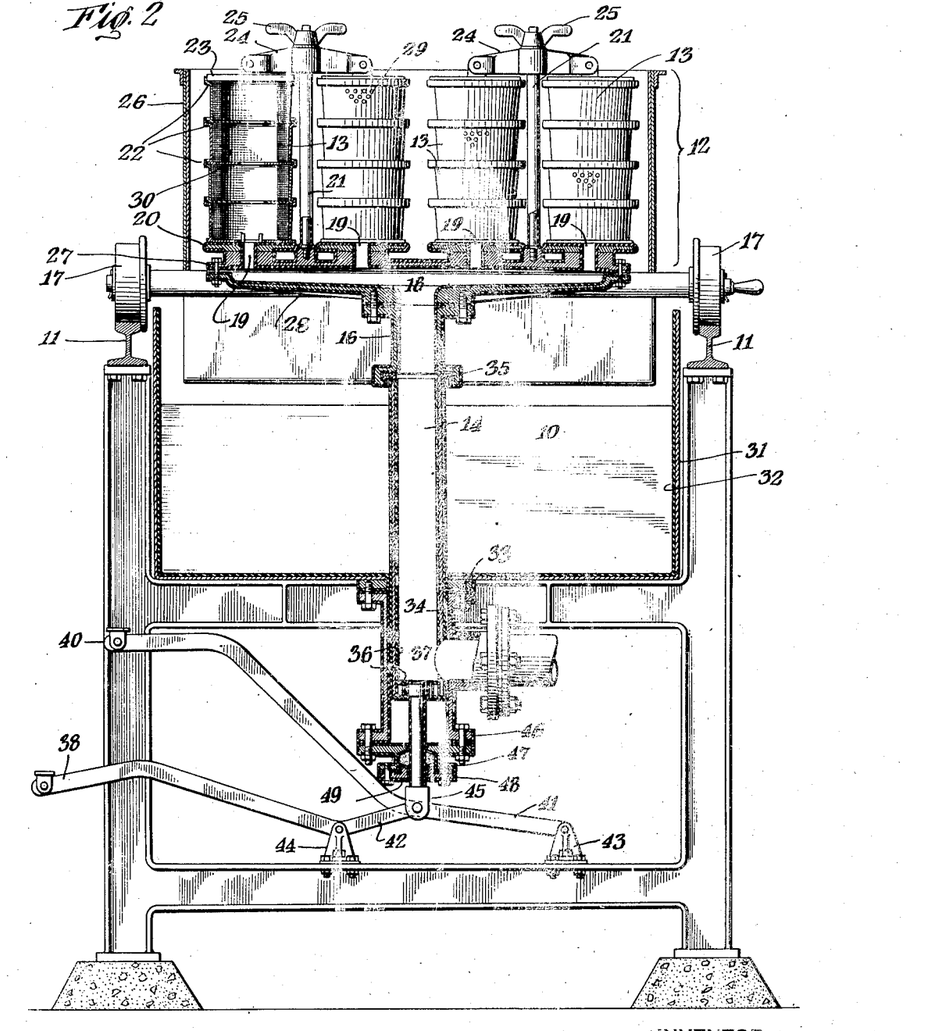
Figs. 2 and 3 are end and side views, respectively, showing a part of the apparatus in greater detail.
Figure 3:
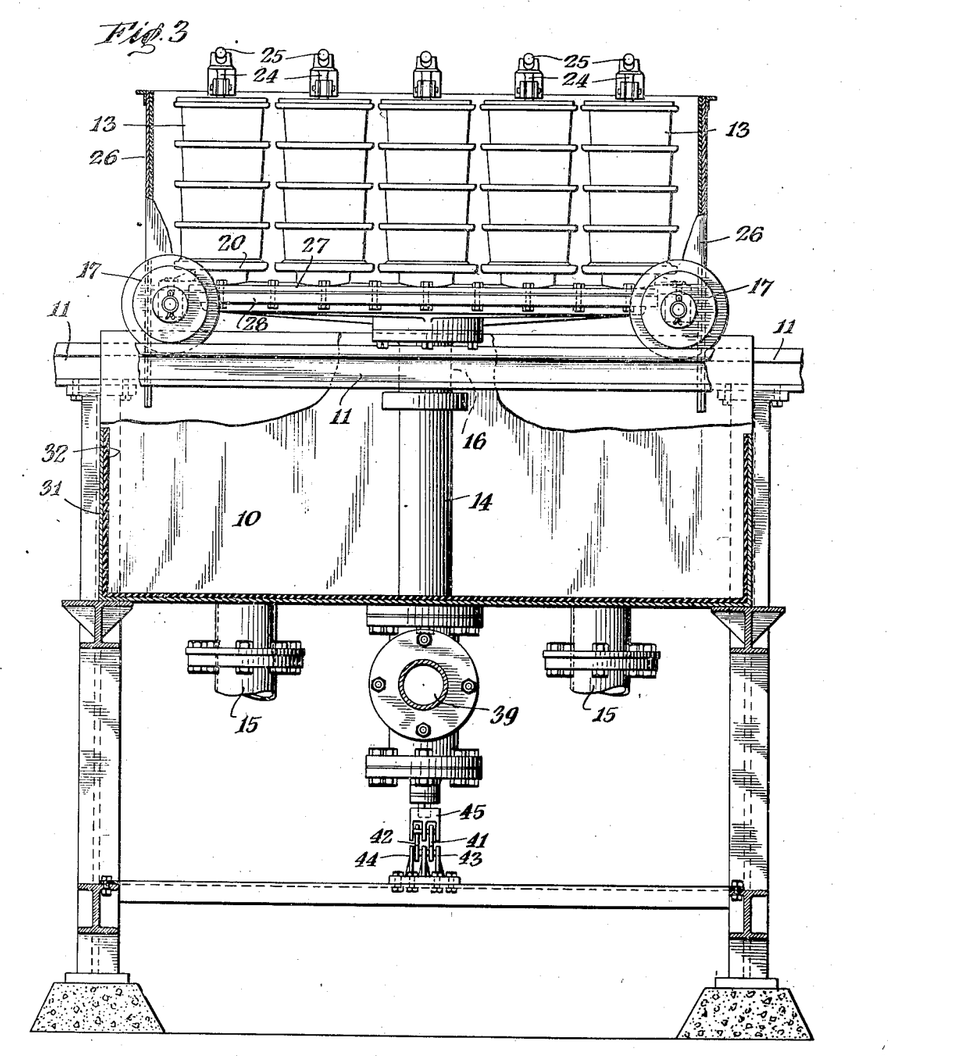

Referring more particularly to Figs. 2 and 3, the rails above the vats are shown at 11; the movable carriage or "pot header", as it may be conveniently designated, is shown at 12; the individual pots at 13; the inlet pipe in the vat at 14; the inlet pipe for the pot header at 16; and the wheels by which the pot header is moved along the rails to its successive positions above the several vats, at 17.

I have shown the pot header provided with a distributing manifold or chamber 18 connected to the inlet pipe 16. This chamber, in this particular case, is shown provided with twenty outlet openings designated 19. These outlet openings are arranged in five rows of four each, and each of these outlet openings is surrounded by an adapter 20. Between each pair of openings is a clamp stud bolt 21 which is long enough to accommodate any desired number of perforated pots or cake processing containers 13. In the arrangement illustrated, I have shown four of these pots (arranged one above the other) in operative connection with each fluid outlet opening, 19; but in practice any desired number of such pots may be used one above the other. Rubber rings or gaskets 22 may be inserted between the successive stacked pots, so as to prevent leakage. The top pot is provided with a cover 23, which may be tightly clamped in place over the rubber ring or gasket 22 (if used) or may be seated upon the flat annulus 67 (Figs. 5 and 6) to prevent leakage, by means of the cover clamp 24 and clamp nut 25 on the clamp stud bolt 21. If desired an enclosure or guard 26 can be mounted on the carriage so as to prevent slopping or escape of the liquid and for directing it back to vat 10. The chamber 18 in the distributing manifold may suitably be constituted by a top pan 27 and bottom pan 28 bolted together as shown. The processing pots 13 are provided with perforations 29. The cakes to be processed are shown within the processing pots at 30. The metal wall 31 of the tank or vat 10 is suitably lined with rubber, as shown at 32. The bottom of the vat 10 is connected by means of the flange 33 to the valve T 34. The bottom of the inlet pipe 16 is provided with a gasket 35, and a riser pipe assembly 36 is associated with the valve port 37, in such a way that when the pot header is moved into position over the inlet pipe 14, the connection to the inlet pipe 16 from the inlet pipe 14 is automatically made by elevating the riser pipe assembly 36 by depressing the pedal 38. The valve port 37 is then, automatically, simultaneously moved into registry with the feed inlet 39 so that the valve is opened and the processing liquid is admitted to the pot header. By depressing the pedal 40 the valve port 37 is closed, the flow of liquid is cut off, and the riser pipe assembly 36 is depressed so as to disconnect the inlet pipe 16 from the inlet pipe 14. This operation is accomplished by means of the two operating levers 41 and 42 provided, respectively, with the fulcrum 43 and the fulcrum 44 and connected to the yoke 45. The valve T bottom flange is shown at 46, a suitable packing at 47, a packing retainer at 48, and a rubber covering on the same at 49. The apparatus with which the liquid is allowed to come in contact is all preferably rubber covered for its protection. Two outlets, 15, may be provided in the vat 10 (Fig. 3), the one being connected to a sewer or drain and the other being connected to a pump for recirculation of the fluid if it is desired to save it. Either outlet may of course be employed at will.

In the operation of the apparatus the header or carriage 12 is moved to its starting position, shown at the extreme upper right of Fig. 1. The processing containers or pots 13 are charged with the cakes to be treated, and stacked one above the other (with gaskets 22 between them, or else with tight joints made by the flat seats 67, (Figs. 5 and 6), upon the adapters 20. When the desired number of charged pots has been placed over and in communication with each fluid discharge opening 19, a cover 23 is placed on the uppermost pot, with a gasket 22 between, and is clamped down by means of the clamp 24 and nut 25. When the entire header carriage 12 has thus been filled with charged pots, it is moved over the first vat 10; the inlet pipe 16 is brought into registry with the inlet pipe 14 and connection is made by depressing the pedal 38 which automatically admits the processing fluid as soon as the connection has been made. This processing fluid is allowed to flow through the inlet 16, is distributed by the distributing manifold chamber 18 and flows out through the discharge openings 19, into the various pots 13 which it fills. The liquid is then forced through the cakes and escapes through the liquid discharge perforations 29, flowing back into the vat 10.

When the cakes have been sufficiently processed with the desired fluid, as may be readily ascertained, for example by timing, the pedal 40 is depressed. This shuts off the flow of processing liquid, and disconnects the supply pipe 14 from the inlet pipe 16. The header is then moved to its next position, and the process is repeated with the liquid appropriate to the next vat.

Referring, for example, to the apparatus shown in Fig. 1, a number of headers or movable carriages 12 can, of course, be passed simultaneously through the apparatus, and in the extreme case there may be one header always over each vat, or any less number may be put through the apparatus. If desired, the carriages can be returned from the finish end (i. e. lower left end Fig. 1) to the start or upper right hand end by suitable return rails, not shown. If desired, the apparatus may be laid out in a circular or other suitable shape, instead of in a straight line; or it may be arranged in two rows with shuttle connections between them, so that the finished carriage comes back to the starting point, where the processed cakes may be removed, and the carriage reloaded with pots containing fresh cakes in be processed.

Fig. 6 shows a sectional elevation of a suitable processing container or pot for use in the apparatus. It may be made, for example of pressed steel in the shape shown, and covered with rubber. A grooved flange 50 may be provided for the reception of a rubber gasket or ring 22. The pots are thus interchangeable, and any pot can be used in any position. A flat annulus or seat, 67, may also be provided so as to form a tight joint with the pot above, when the pots are stacked one above the other, or for the cover of the top pot. By this means, the use of the gaskets 22 may be dispensed with in certain cases, and it may then be desirable to use the annular flaps or washers 68 to divert liquid flowing down the wall of the pot, and prevent it from collecting in the groove 50 of the pot below. The perforations in the pot are diagrammatically indicated at 29. In one form of apparatus which I have used successfully, I have used three courses of perforations in the pot, sixteen perforations in each of the two lower courses, and eight perforations, staggered from those below, in the upper course.

Figure 4:
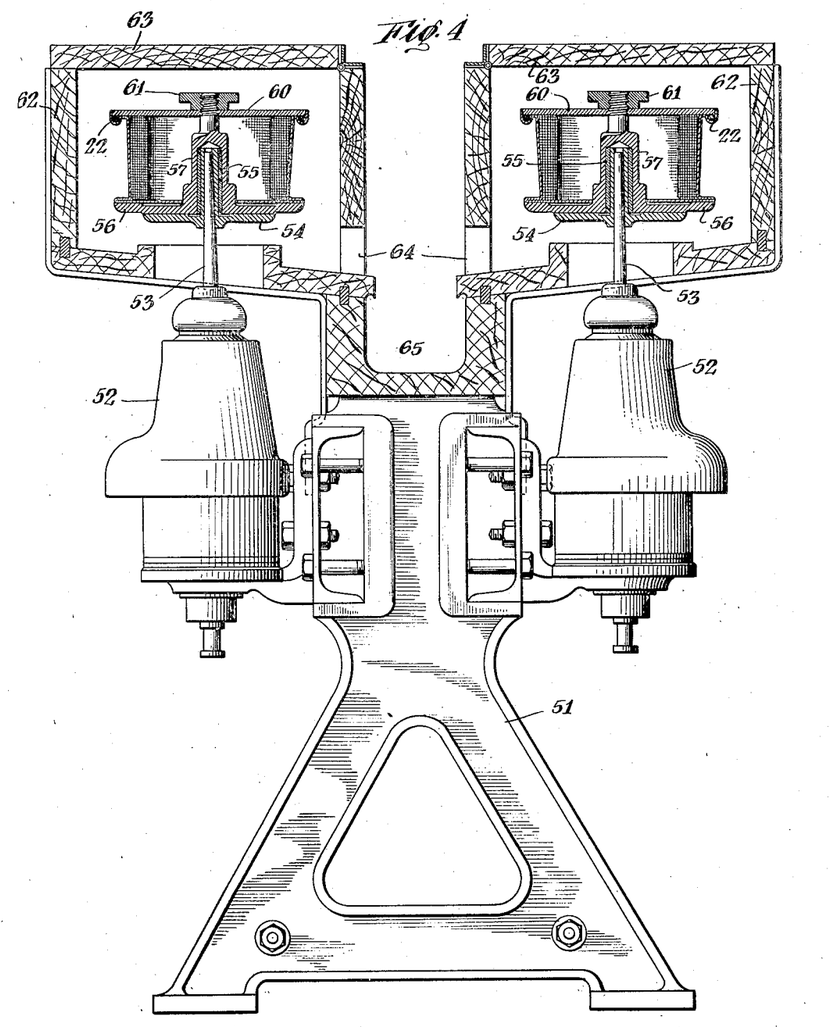
Fig. 4 shows a section of a hydroextractor which may form a part of the apparatus.

When the pots containing the processed cakes are removed from the end of the apparatus shown in Figs. 1, 2 and 3, it is in some cases desirable to dry the processed cake by means of centrifugal force or hydro-extraction. This may be suitably accomplished by transferring the pots, just as they come from the header, and containing the processed cakes, onto a hydro-extractor, such as that which is shown in Figs. 4 and 5.

A suitable supporting frame 51 is provided on each side with an electric motor 52 of which the shaft terminates in a spindle 53. A detail of the pot and spindle assembly is shown in Fig. 5. The spindle 53 has applied to it a spindle-adapter 54 suitably made of bronze. On this is fitted a bronze bushing 55 over which is fitted in turn an adapter 56, suitably made of an artificial resin such as bakelite (or other suitable condensation product of a phenol or cresol with formaldehyde or its polymers), or similar material. This adapter, 56, has a central portion 57 which extends through the aperture 58 in the bottom of the pot and terminates in a screw-thread 59. A cover 60, which may suitably be radially slotted around its periphery, to a desired depth, as indicated at 69, and suitably made of bakelite, may be placed over the pot and clamped down on the gasket 22 by means of the hand nut 61, which is also suitably made of bakelite. This arrangement not only holds the cover in place but also firmly clamps the pot to the adapter which is, in turn, fastened to the spindle 53. The whole may then be rotated at high speed by means of the motor 52, and the cake is thus dried or hydro-extracted in the same pot or processing container in which it was processed. A suitable enclosure or housing 62, (Fig. 4) provided with a hinged lid, 63, may be arranged around the spindle to prevent leakage and to collect the spray from the pot, and the removed liquid may flow off through the openings 64 and trough 65.

Figures 7, 8:
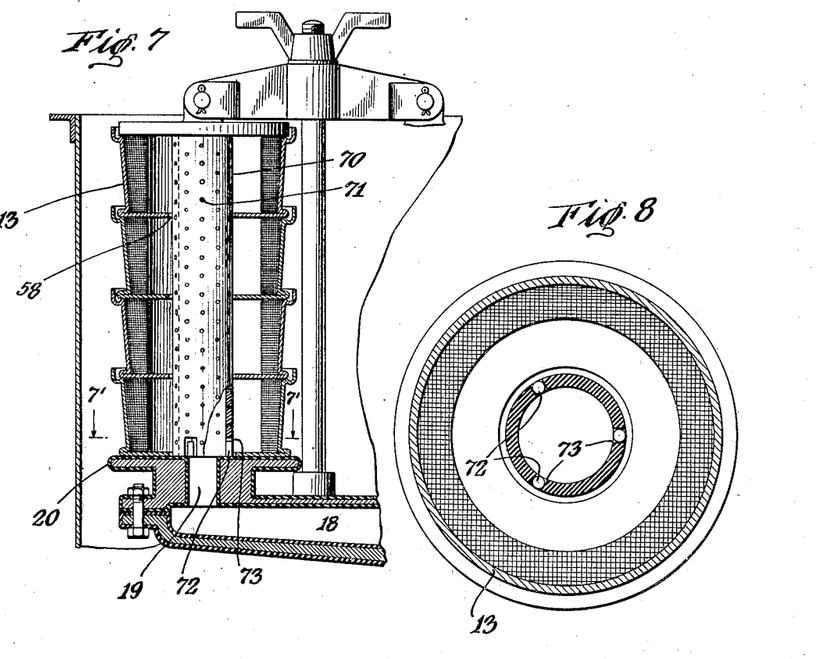
Fig. 7 is a cross-sectional view showing a vertical section through a part of an apparatus which is an improvement upon that shown in Fig. 2.
Fig. 8 is a cross-section on line 7' 7' of Fig. 7.

In some cases, I have found that there is an undesirable rush of treating liquid either into or out of the perforated cake treating containers, when the supply of treating liquid is turned on or off. To overcome that difficulty I have found, in some instances, that it is desirable to employ a perforated tube 70 (see Fig. 7). That tube may be long enough to pass through any desired number of the perforated treating or processing containers 13, and is preferably of such a diameter that it just clears the internal aperture 58 in the bottom of each container as shown in Fig. 7. Suitable perforations 71 in the tube are provided as shown and I have found that in a preferred arrangement these perforations are of such size and number that their total area in the entire tube 70 is about equal to the cross-sectional area of the outlet opening 19 from the distributing manifold 18 to which the tube 70 is applied. For retaining the perforated tube 70 in its proper position, I provide a suitable number, say three, pins 72, projecting above the adapter 20. The tube 70 is provided with slots 73 adapted to receive the pins 72, and retain the tube in place, as shown in Fig. 7, and also in the cross-sectional view, Fig. 8 which is a section on line 7' 7' of Fig. 7.

The use of the perforated tube 70 has been found to reduce the tendency to injure the yarn, and the likelihood of disturbance of the yarn strands in the cake, by a rush of treating liquid. The number of perforations is such that the actual time required for application of treating liquid is not materially increased, and the advantage is secured that the treating liquid is applied to the cake in such a way that it does not disturb the yarn.

Figure 9:
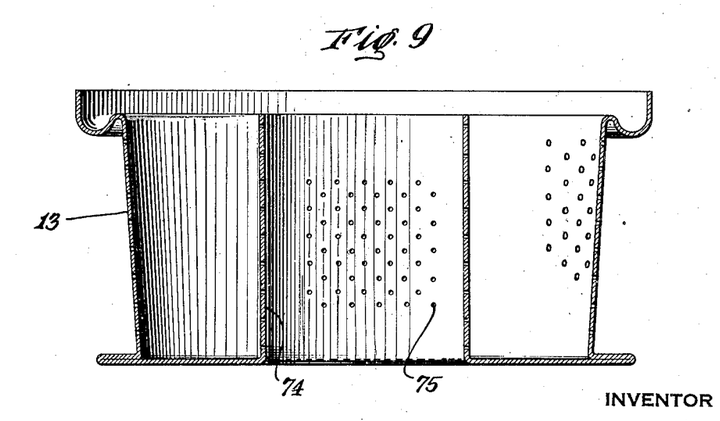
Fig. 9 is a vertical section through a different form of perforated yarn processing container or cake holder.

A different arrangement is illustrated in Fig. 9, in which each perforated processing container 13 is provided with an integral internal wall or collar 74, provided with perforations 75 which act in the same manner as the perforations 71 in the tube 70. The collar 74 is preferably integral with the bottom of the container, as shown in Fig. 9, and of such height that it just contacts with the bottom of the next superposed container, to make a substantially liquid-tight joint when a number of containers are nested one above the other as shown in the other figures. The container 13 may be made of aluminum so as to resist the corrosive action of the treating liquids, or may be made of steel or other suitable metal covered with rubber as shown in Fig. 6.

Figure 10:
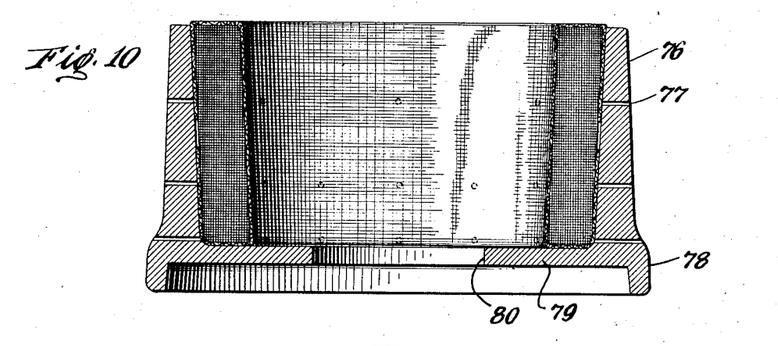
Fig. 10 is a vertical section through still a different form of perforated cake treating container including a yarn cake.

Fig. 10 is a vertical sectional view through a different form of perforated yarn treating container which is suitable for use in practicing the foregoing method instead of the container shown in Figs. 6 and 9. This form of container may suitably be molded from a phenolic condensation product such as bakelite or micarta, and consists of an upstanding wall portion 76 which may be tapered interiorly to conform to the outside taper of a freshly spun yarn cake. The perforations are indicated at 77. The container is also provided with a peripheral flange or apron 78 extending downwardly and outwardly from and below the bottom of the container, the bottom being indicated at 79, and having an aperture 80 therethrough, for ingress and egress of treating fluid.

The container is preferably so proportioned that the interior diameter of the recess formed by the downwardly extending flange 78, is substantially the same as, or a little greater than, the external diameter of the top of the perforated wall 76, the inner face of the former and outer face of the latter both being tapered outwardly and downwardly in substantially the same amount, or the flange 78 being slightly more tapered, so that each container may be readily nested with other similar containers, one above the other. When so nested, the bottom of each container forms a cover for the container below, and the inner face of the bottom flange 78 of each container engages the outer face of the top of the wall 76 of the container below. The interior depth of each container is preferably so proportioned that a freshly spun yarn cake, either alone or when enclosed in a fabric covering if that be used, will extend slightly above the top of the wall 76, as shown in Fig. 10. Then when a plurality of containers with their contained cakes are nested one above the other as shown in Fig. 11, each cake is slightly compressed and a liquid tight joint is formed at the junction of the containers, so that treating liquid admitted through the apertures 80 is forced to pass outwardly through the cakes themselves and escape by way of the perforations 77, and does not escape at the joints or pass around the cakes.

Figure 11:
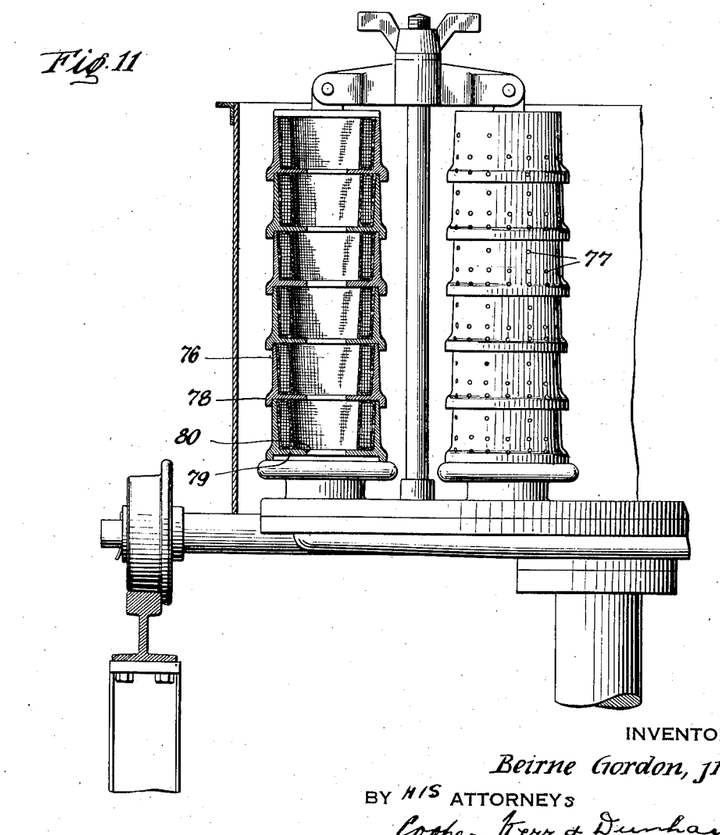
Fig. 11 is a vertical section similar to Figures 7 and 2, but showing the use of the type of yarn cake treating containers illustrated in Fig. 10.

Fig. 11 is a view partly in vertical section and partly in elevation of a movable carriage and liquid distributing manifold, similar to that shown in Figs. 2 and 7 except that in Fig. 11, the Fig. 10 form of cake treating container is shown nested on the carriage, substituted for the form of container shown at 13 in Figs. 2 and 7.

The present invention is not limited to the specific form of either the process or the apparatus described herein, and variations of both may fall within the scope of my invention, as will be apparent to those skilled in the art.

I claim:

1. Process of manufacturing artificial silk which comprises, in combination, the steps of ejecting a plurality of streams of viscose from the orifices of a spinnerette into a spinning bath, coagulating the ejected viscose streams into a plurality of filaments, twisting the filaments into yarn, winding the yarn into a cake having a conical outer surface by passing the coagulated filaments into a rotating tapered spinning pot, removing the spun cake from the pot and inserting it within a tapered processing container for positively supporting the cake at its exterior conical surface, and in stationary condition, to prevent disturbance of the yarn, and subjecting the yarn, in cake form, and while thus exteriorly supported in said stationary condition, to the action of a continuous and confined body of desired processing liquid, by forcing the same through the yarn cake under pressure.

2. Process of manufacturing artificial silk which comprises, in combination, the steps of ejecting a plurality of streams of viscose from the orifices of a spinnerette into a spinning bath; coagulating the ejected viscose streams into a plurality of filaments, twisting the filaments into yarn and winding the yarn into a cake having a conical outer surface by passing the coagulated filaments into a rotating tapered spinning pot, removing the spun cake from the pot and inserting it within a tapered processing container for positively supporting the cake at its exterior conical surface, and in stationary condition, to prevent disturbance of the yarn, and subjecting the yarn, in cake form, and while thus exteriorly supported in said stationary condition, to the successive actions of continuous and confined bodies of a plurality of processing liquids in sequence, whereby all of the steps of treatment of the yarn are performed upon the undisturbed yarn cake as it is originally spun, and without any rewinding or handling of the yarn until its processing is completed.

3. Process of manufacturing artificial silk including the step of forcing a continuous and confined body of a desired processing liquid outwardly through a hollow frustro-conical spun yarn cake while firmly supporting the same at its exterior conical surface, and in a stationary condition, to prevent disturbance of the yarn.

4. Process of manufacturing artificial silk wherein a hollow frustro-conical spun yarn cake is subjected to the successive actions of a plurality of processing liquids in a desired sequence while the cake is firmly supported at its exterior conical surface, and held in stationary condition under axial compression, to prevent disturbance of the yarn, whereby treatment of the yarn is completed in the original cake.

5. Process of manufacturing artificial silk wherein viscose is coagulated and spun into a hollow frustro-conical yarn cake in the usual way in a spinning bucket, including the steps of removing the spun cake from the bucket, inserting it in a tapered perforated processing container, and processing the yarn while in cake form by introducing a processing liquid under pressure into the interior of the yarn cake while the cake is thus firmly and unyieldingly supported over substantially its entire exterior conical surface, and while its interior surface is protected against disturbance by said processing liquid, and causing said processing liquid to flow through the yarn cake while thus supported and protected and act upon the yarn strands while they are retained in undistorted form as originally spun in the cake.

6. Process of manufacturing artificial silk wherein viscose is coagulated and spun into a hollow frusto-conical yarn cake in the usual way, including, in combination, the steps of removing the spun cake from the spinning pot and inserting it in a tapered, perforated processing container, providing external support and internal protection for the yarn while in cake form in said processing container, to prevent stretching, distortion and injury to the yarn, and simultaneously subjecting the cake to axial compression in said container, then introducing into the interior of the yarn cake first one processing liquid and thereafter one or more other different processing liquids so that each liquid is forced to pass through the cake for treating the yarn therein, and leakage of processing liquid above and below the cake is substantially prevented by the axial compression thereof while formation of preferred channels through the cake is minimized by said external support.

7. Apparatus for the treatment of artificial silk yarn in cake form, comprising, in combination, a plurality of vats, a liquid supply pipe in each vat, a movable carriage arranged for movement over each of said vats in succession, a liquid distributing manifold provided with an inlet port and a plurality of outlet ports and mounted on said movable carriage, means for connecting the inlet port of said manifold to each of said fluid-supply pipes in succession, and a perforated yarn cake container associated with each of the outlet ports of said manifold and adapted for the support of an artificial silk yarn cake during its treatment with a processing liquid.

8. A yarn cake treating apparatus including a series of liquid supply pipes for different processing liquids; a movable carriage with provision for supporting a plurality of yarn cakes thereon for treatment; and means for permitting movement of said carriage into operative association with any desired one of said liquid supply pipes at will and directing liquid from the said pipe to the carriage and through the yarn cakes carried thereby.

9. A yarn treating apparatus including a series of supply pipes for different processing liquids; a yarn cake carrying carriage; means for supporting said carriage so that it is relatively displaceable with respect to said series of pipes; and means for establishing a fluid conducting connection between any one pipe and the said carriage, for the purpose described.

10. A yarn processing apparatus, comprising, in combination, a movable carriage, means supporting said carriage for movement, a liquid distributing manifold mounted on said carriage, a plurality of liquid outlet openings in said distributing manifold, at least one yarn cake container secured to each outlet, an inlet opening in said manifold, and means for supplying a desired processing liquid to said manifold through said inlet opening at a desired predetermined position of said movable carriage.

11. In an apparatus for processing yarn, the combination of a movable carriage, means for supporting said carriage for movement, a chambered head mounted on said carriage and provided with an inlet for fluid and a plurality of outlets for fluid, a perforated container associated with each of said outlets, and adapted to receive a yarn cake, a plurality of stationary fluid-supply pipes positioned at spaced points along said supporting means, and means for removably connecting the inlet to said head with each of said fluid-supply tubes in succession.

12. A yarn processing apparatus including a chambered head; a liquid supply pipe; a second pipe telescoped with said first pipe and slidable therein; and actuating means associated with said second pipe for bringing the same into and out of connection with said head.

13. A yarn processing apparatus including a chambered head; a pipe for conveying liquid thereto; a second pipe telescoped with said first pipe and slidable therein to establish liquid connection with said chambered head; a valve controlling the passage of liquid through said pipes; and means for simultaneously establishing said connection and actuating said valve to admit liquid to said head.

14. A yarn treating apparatus including a displaceable fluid-conveying conduit adapted for elevation and depression to establish connection or effect disconnection; a foot treadle connected to cause elevation of the conduit by depression of said treadle; and another foot treadle connected to cause depression of the conduit by depression of said treadle.

15. Process of manufacturing artificial silk including the step of forcing a continuous and confined body of a desired processing liquid through the fibres of a hollow frustro-conical spun yarn cake, while firmly and rigidly supporting the cake in a stationary condition at its exterior conical surface, and simultaneously protecting the interior surface of the cake to prevent disturbance or disarrangement of the fibres and channelling of the cake by the processing liquid, and to promote uniform treatment of the fibres therewith.

16. Process of manufacturing artificial silk including the step of forcing a continuous and confined body of a desired processing liquid through the fibres of a hollow frustro-conical spun yarn cake, while firmly and rigidly supporting the cake in a stationary condition over substantially the whole of its exterior conical surface, and maintaining the cake under vertical compression, while simultaneously protecting the interior surface of the cake to prevent disturbance or disarrangement of the fibres and channelling of the cake by flow of the processing liquid and to promote uniform treatment of the fibres therewith.

17. Process of manufacturing artificial silk comprising spinning a hollow frustro-conical cake of artificial silk yarn, maintaining said cake in a stationary and undisturbed condition by firmly and rigidly supporting the same over substantially the whole of its exterior conical surface while simultaneously subjecting the cake to axial compression and protecting the interior surface of the cake by the application of a fabric covering to prevent disturbance or disarrangement of the yarn by the processing liquid, and while the yarn cake is thus supported, compressed and protected, forcing through the yarn fibres, under pressure, from the interior of the cake outwardly, a continuous and confined body of a desired processing liquid in such manner as to produce uniform treatment of the yarn fibres without disturbance or disarrangement thereof and without channelling the yarn cake.

18. Process of manufacturing artificial silk comprising spinning a hollow frustro-conical cake of artificial silk yarn, maintaining said cake in a stationary and undisturbed condition by firmly and rigidly supporting the same at its exterior conical surface while subjecting the cake to axial compression and protecting its interior surface against disturbance or disarrangement of the yarn, and, while the yarn cake is thus supported and protected, forcing through the yarn fibres, under pressure, continuous and confined bodies of first one, and then in succession a plurality of other and different treating liquids, in such manner as to produce uniform treatment of the yarn fibres without disturbance or disarrangement thereof, without channelling of the yarn cake, and with minimized leakage of liquid above and below the cake, whereby treatment of the yarn is completed in the original cake without injury to the yarn.

19. Process of manufacturing artificial silk comprising spinning a hollow frustro-conical cake of artificial silk yarn, maintaining said cake in a stationary and undisturbed condition by firmly and rigidly supporting the same at its exterior conical surface, and while the yarn cake is thus supported forcing through the yarn fibres, under pressure, continuous and confined bodies of first one, and then in succession a plurality of other and different treating liquids, in such manner as to produce uniform treatment of the yarn fibres without disturbance or disarrangement thereof and without channelling of the yarn cake, whereby treatment of the yarn is completed in the original cake without injury to the yarn.

20. Process of manufacturing artificial silk comprising spinning a hollow frustro-conical cake of artificial silk yarn, maintaining said cake in a stationary and undisturbed condition by wrapping the same in fabric and firmly and rigidly supporting the wrapped cake at its exterior conical surface, and while the yarn cake is thus wrapped and supported forcing through the yarn fibres, under pressure, continuous and confined bodies of first one and then in succession a plurality of other and different treating liquids, in such manner as to produce uniform treatment of the yarn fibres without disturbance or disarrangement thereof and without channelling of the yarn cake, whereby treatment of the yarn is completed in the original cake without injury to the yarn.

21. Process of manufacturing artificial silk wherein a spun yarn cake is first wrapped in a porous fabric to present a layer of permeable material over the outer conical surface of the cake, and the wrapped cake is then subjected to the action of a desired processing liquid while maintained in stationary and undisturbed condition and firmly supported at its exterior surface with said permeable layer interposed between the outer surface of the cake and the support.

22. An artificial yarn treating container consisting of an upstanding perforated wall portion tapered interiorly to conform to the exterior taper of a freshly spun yarn cake, a bottom portion with an aperture therethrough, and a peripheral flange or apron extending downwardly from and below said bottom portion, and having an outward taper on its interior face, the interior diameter of the recess formed by said flange being substantially the same as the external diameter of the top of said upstanding perforated wall, whereby said container is adapted to be nested with other similar containers so that the bottom of the container forms a cover for the container below and the inner face of the bottom flange of the container engages the outer face of the top of the wall of the container below.

23. Process of manufacturing artificial silk comprising first spinning a hollow frustro-conical externally tapered cake of artificial silk yarn by feeding coagulated viscose filaments into a rapidly-rotating tapered spinning pot, then withdrawing the tapered spun yarn cake from the spinning pot and inserting it within a tapered perforated processing container, there maintaining said cake in stationary and undisturbed condition by encasing the cake in a fabric covering and firmly and rigidly supporting the fabric-covered cake at its exterior conical surface while applying an axial compression to the cake, and while the cake is thus externally supported and axially compressed, forcing through the yarn fibres, in one direction only, from the inside of the cake outwardly, and under a higher pressure inside the cake than outside thereof, continuous and confined bodies of a plurality of different desired treating liquids in succession, and causing said treating liquids to act uniformly and completely upon the yarn fibres contained in the cake without disturbance or disarrangement thereof and without producing any channelling of the cake or preferred paths therein, whereby desired treatment and purification of the yarn with processing liquids is completed upon the yarn in the same form that it was originally spun in the cake, and without injury to the yarn.

24. Process of manufacturing artificial silk comprising first spinning a hollow frustro-conical externally tapered cake of artificial silk yarn by feeding coagulated viscose filaments into a rapidly-rotating tapered spinning pot, then withdrawing the tapered spun yarn cake from the spinning pot and inserting it within a tapered perforated processing container, there maintaining said cake in stationary and undisturbed condition by firmly and rigidly supporting the same at its exterior conical surface, and while the cake is thus externally supported forcing through the yarn fibres, in one direction only, from the inside of the cake outwardly, and under a higher pressure inside the cake than outside thereof, continuous and confined bodies of a plurality of different desired treating liquids in succession, and causing said treating liquids to act uniformly and completely upon the yarn fibres contained in the cake without disturbance or disarrangement thereof and without producing any channelling of the cake or preferred paths therein, whereby desired treatment and purification of the yarn with processing liquids is completed upon the yarn in the same form that it is originally spun in the cake, and without injury to the yarn; and thereafter extracting excess liquid from the yarn cake by subjecting it to rapid rotation about its central vertical axis while still supporting the cake at its external conical surface, and preventing distortion thereof and disturbance and injury of the yarn.

BEIRNE GORDON, Jr.